United States Patent
Cao et al.

(10) Patent No.: US 9,757,970 B2
(45) Date of Patent: Sep. 12, 2017

(54) METHOD FOR MANUFACTURING GRAVURE PLATE

(71) Applicant: MURATA MANUFACTURING CO., LTD., Kyoto-fu (JP)

(72) Inventors: Kunxian Cao, Kyoto-fu (JP); Yoshiharu Kubota, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 273 days.

(21) Appl. No.: 14/505,732

(22) Filed: Oct. 3, 2014

(65) Prior Publication Data

US 2015/0113801 A1 Apr. 30, 2015

(30) Foreign Application Priority Data

Oct. 28, 2013 (JP) .................................. 2013-223315
Jul. 3, 2014 (JP) .................................. 2014-137854

(51) Int. Cl.
*B41M 1/10* (2006.01)
*B41N 1/06* (2006.01)
(Continued)

(52) U.S. Cl.
CPC ............... *B41N 1/06* (2013.01); *B41C 1/00* (2013.01); *B41C 1/188* (2013.01); *B41N 1/20* (2013.01);
(Continued)

(58) Field of Classification Search
CPC .. B41C 1/00; B41C 1/188; B41N 1/06; B41N 1/20; H01C 1/14
See application file for complete search history.

(56) References Cited

U.S. PATENT DOCUMENTS 3,661,575 A * 5/1972 Ketley .................. G03F 7/0275
101/401.1
4,405,709 A * 9/1983 Katano ..................... G03F 5/20
101/401.1
(Continued)

FOREIGN PATENT DOCUMENTS

CN 101678697 A 3/2010
JP H11-188831 A 7/1999
(Continued)

OTHER PUBLICATIONS

An Office Action; "Notice of Reasons for Rejection," issued by the Japanese Patent Office on Nov. 22, 2016, which corresponds to Japanese Patent Application No. 2014-137854 and is related to U.S. Appl. No. 14/505,732; with English language translation.

*Primary Examiner* — Minh Trinh
(74) *Attorney, Agent, or Firm* — Studebaker & Brackett PC

(57) ABSTRACT

A method for manufacturing a gravure plate includes, setting a certain measurement area on a surface of the gravure plate, finding at least one of a spatial volume that is the total of the volume of a space formed by a plurality of cells located in the measurement area and an average depth obtained by dividing the spatial volume by a surface area of the measurement area, and adjusting, based on a relationship between at least one of the spatial volume and the average depth and an application thickness of a printing material after printing, at least one of the spatial volume and the average depth so as to fall within at least one of a specified value range for the spatial volume and a specified value range for the average depth determined in accordance with a target value range for the application thickness.

7 Claims, 11 Drawing Sheets

(51) Int. Cl.
*B41C 1/00* (2006.01)
*B41C 1/18* (2006.01)
*B41N 1/20* (2006.01)
*H01C 1/14* (2006.01)
*H01G 13/00* (2013.01)

(52) U.S. Cl.
CPC ............ *H01C 1/14* (2013.01); *H01G 13/006* (2013.01); *Y10T 29/49117* (2015.01); *Y10T 29/49769* (2015.01)

(56) References Cited

U.S. PATENT DOCUMENTS

| | | | |
|---|---|---|---|
| 4,812,219 A * | 3/1989 | Sattrup | B41N 1/20 101/375 |
| 5,293,426 A | 3/1994 | Wouch et al. | |
| 7,047,880 B2 * | 5/2006 | Ishimoto | B41M 1/10 101/170 |
| 7,739,950 B2 | 6/2010 | Ishimoto et al. | |
| 9,090,052 B2 * | 7/2015 | Shigeta | B41N 1/06 |
| 2004/0118180 A1 | 6/2004 | Keating | |
| 2004/0163555 A1 | 8/2004 | Ishimoto et al. | |
| 2006/0117970 A1 | 6/2006 | Ishimoto et al. | |
| 2006/0204718 A1 * | 9/2006 | Kawakami | G02B 5/02 428/141 |
| 2010/0064918 A1 * | 3/2010 | Shigeta | B41C 1/02 101/377 |
| 2010/0108874 A1 | 5/2010 | Zahedi | |
| 2015/0113801 A1 * | 4/2015 | Cao | B41C 1/00 29/825 |

FOREIGN PATENT DOCUMENTS

| | | |
|---|---|---|
| JP | 2004-522972 A | 7/2004 |
| JP | 2006-105830 A | 4/2006 |
| JP | 2009-090661 A | 4/2009 |
| JP | 2009-172949 A | 8/2009 |
| TW | I229877 B | 3/2005 |

* cited by examiner

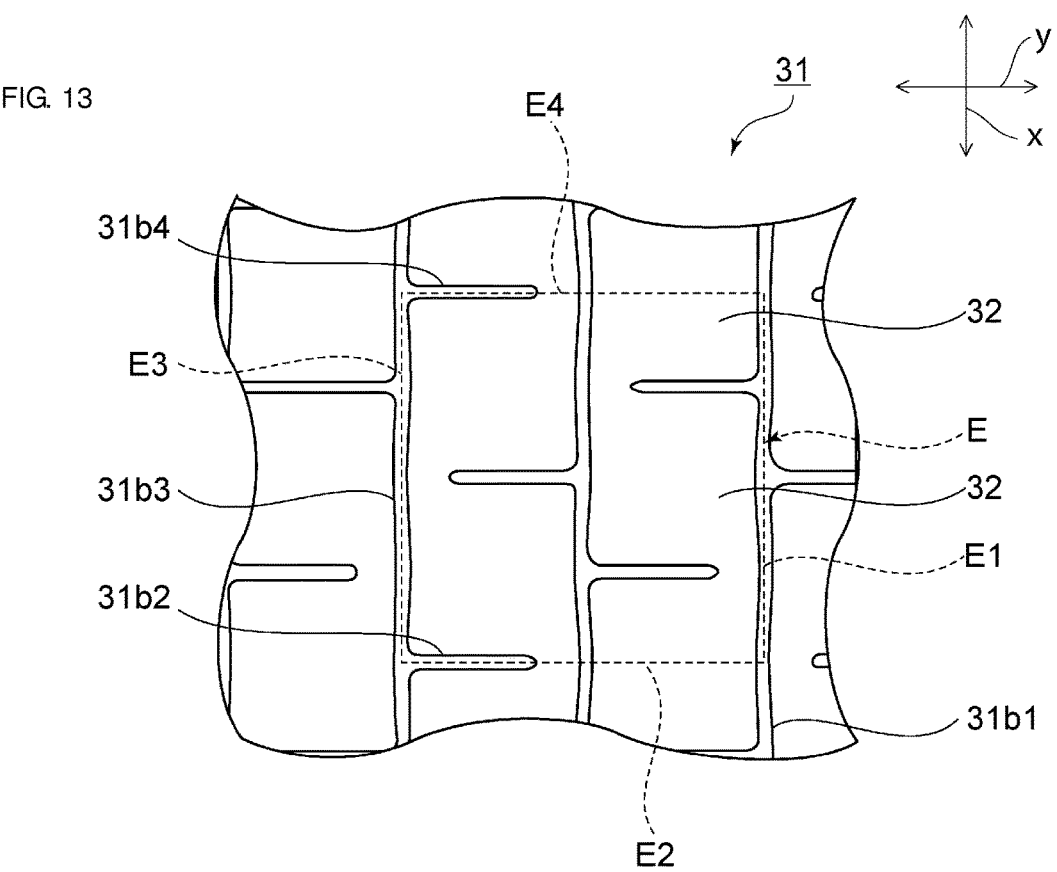

METHOD FOR MANUFACTURING GRAVURE PLATE

CROSS REFERENCE TO RELATED APPLICATIONS

This application claims benefit of priority to Japanese Patent Application No. 2013-223315 filed Oct. 28, 2013, and to Japanese Patent Application No. 2014-137854 filed Jul. 3, 2014, the entire content of each of which is incorporated herein by reference.

TECHNICAL FIELD

The present technical field relates to methods for manufacturing gravure plates used, for example, to print a paste for forming electrodes in an electronic component, gravure printing methods, and methods for manufacturing electronic components using such gravure printing methods.

DETAILED DESCRIPTION

Gravure printing is widely used to print an internal electrode paste for laminated ceramic electronic components, for example. Japanese Unexamined Patent Application Publication No. 2009-90661 discloses a gravure roll used in this type of gravure printing as well as a method for manufacturing the gravure roll. In the gravure roll, many cells, or in other words, many recess portions, are formed for applying an electrode paste or the like to a surface of the roll. According to the method for manufacturing the gravure roll disclosed in Japanese Unexamined Patent Application Publication No. 2009-90661, the cells, which are such recess portions, are formed so that the depth of the cells, or in other words, a plate depth, takes on a specific value. The plate depth, corresponding to the cell depth, is furthermore adjusted based on an amount of etching, an amount of polishing, and so on employed when forming the recess portions.

With a method that controls cell dimensions based on the plate depth, as is the case in Japanese Unexamined Patent Application Publication No. 2009-90661, there has been a high level of variation in the film thickness of paste when the paste is actually printed using the gravure roll. There have also been cases where the film thickness of the printed paste differs greatly from a target film thickness. It has sometimes been necessary to discard the gravure roll in such cases, which has led to poor productivity.

As the film thickness of electrode paste used for internal electrodes in laminated ceramic electronic components has decreased, the cell depth in gravure rolls has fallen to 30 μm or less, for example. Due to this drop in the electrode paste film thickness, the permissible range of variation in the film thickness has become extremely narrow, and the permissible range for the precision with which the cells are processed has also become extremely narrow. As such, improving the productivity has become a major issue.

SUMMARY

It is an object of the present disclosure to provide a method for manufacturing a gravure plate, the method being capable of easily obtaining a gravure plate that is capable of forming a printing material with a high level of precision so as to obtain a target film thickness, as well as to provide a gravure printing method using such a gravure plate and a method for manufacturing an electronic component.

A method for manufacturing a gravure plate according to an aspect of the present disclosure is a method for manufacturing a gravure plate whose surface is provided with a printing portion in which a plurality of recess-shaped cells are defined by banks between the cells. The method for manufacturing a gravure plate according to this aspect of the present disclosure includes the following steps:

setting a certain measurement area on the surface of the gravure plate;

finding at least one of a spatial volume that is the volume of a space formed by a plurality of cells located in the measurement area and an average depth obtained by dividing the spatial volume by a surface area of the measurement area; and adjusting, based on a relationship between at least one of the spatial volume and the average depth and an application thickness of a printing material after printing, at least one of the spatial volume and the average depth so as to fall within at least one of a specified value range for the spatial volume and a specified value range for the average depth determined in accordance with a target value range for the application thickness.

In a method for manufacturing a gravure plate according to another specific aspect of the present disclosure, the step of adjusting at least one of the spatial volume and the average depth includes a step of increasing the depth of the cells through etching.

In a method for manufacturing a gravure plate according to another specific aspect of the present disclosure, the step of adjusting at least one of the spatial volume and the average depth includes a step of adjusting a thickness of a plating film formed on a base surface of the cells when forming a plating film on the surface of the gravure plate.

In a method for manufacturing a gravure plate according to another specific aspect of the present disclosure, a difference in a speed of plating on a part of the surface of the gravure plate between cells and a speed of plating for forming the plating film on the base surface of the cells is used when adjusting the thickness of the plating film.

In a method for manufacturing a gravure plate according to another specific aspect of the present disclosure, the step of adjusting of at least one of the spatial volume and the average depth includes a step of polishing.

In a method for manufacturing a gravure plate according to another specific aspect of the present disclosure, in the step of setting the measurement area, using an image capturing device that captures an image of the surface of the gravure plate, a storage device that stores correlation data indicating a correlation between the average depth or the spatial volume and the application thickness of the printing material after printing, and a control device. A plurality of different images are obtained by the image capturing device in a depth direction of the surface of the gravure plate, and the measurement area is set by the control device based on the plurality of images. In the step of finding at least one of the spatial volume and the average depth, the control device finds a spatial volume by integrating the plurality of images obtained by the image capturing device in a depth direction of the cells or finds the average depth by dividing the found spatial volume by the surface area of the measurement area.

In a method for manufacturing a gravure plate according to another specific aspect of the present disclosure, in the case where at least one of the spatial volume and the average depth found from the plurality of images obtained by the image capturing device capturing images of the surface of the gravure plate is not within at least one of the specified value range for the spatial volume and the specified value range for the average depth that are based on the target value range for the application thickness, the cells of the gravure plate are processed so that at least one of the spatial volume and the average depth falls within the specified value range.

A gravure printing method according to another aspect of the present disclosure includes the steps of preparing a gravure plate obtained through the method for manufacturing a gravure plate according to an aspect of the present disclosure and printing a paste on a surface of a printing target using the gravure plate.

A method for manufacturing an electronic component according to another aspect of the present disclosure includes the steps of preparing an electronic component base material and printing a paste on a surface of the electronic component base material using a gravure plate obtained through the manufacturing method according to the present disclosure.

With the method for manufacturing a gravure plate according to an aspect of the present disclosure, at least one of the spatial volume and the average depth is adjusted so as to fall within the specified value range based on a relationship between at least one of the spatial volume and the average depth and the application thickness of the printing material after printing, and thus a gravure plate capable of printing the printing material at a high level of precision so as to achieve a target film thickness can be provided easily.

With the gravure printing method and the method for manufacturing an electronic component according to aspects of the present disclosure, the gravure plate obtained through the manufacturing method according to an aspect of the present disclosure is used, and thus a paste can be printed on the surface of a printing target, the surface of an electronic component base material, or the like with a high level of precision so as to achieve a target film thickness.

Other features, elements, characteristics and advantages of the present disclosure will become more apparent from the following detailed description of preferred embodiments of the present disclosure (with reference to the attached drawings).

BRIEF DESCRIPTION OF THE DRAWINGS

FIG. 13 is a partial cutout view illustrating a second variation on a gravure plate according to the present disclosure and a measurement area.

DETAILED DESCRIPTION

The present disclosure will be made clear hereinafter through descriptions of a specific embodiment of the present disclosure with reference to the drawings.

Figure 1A:
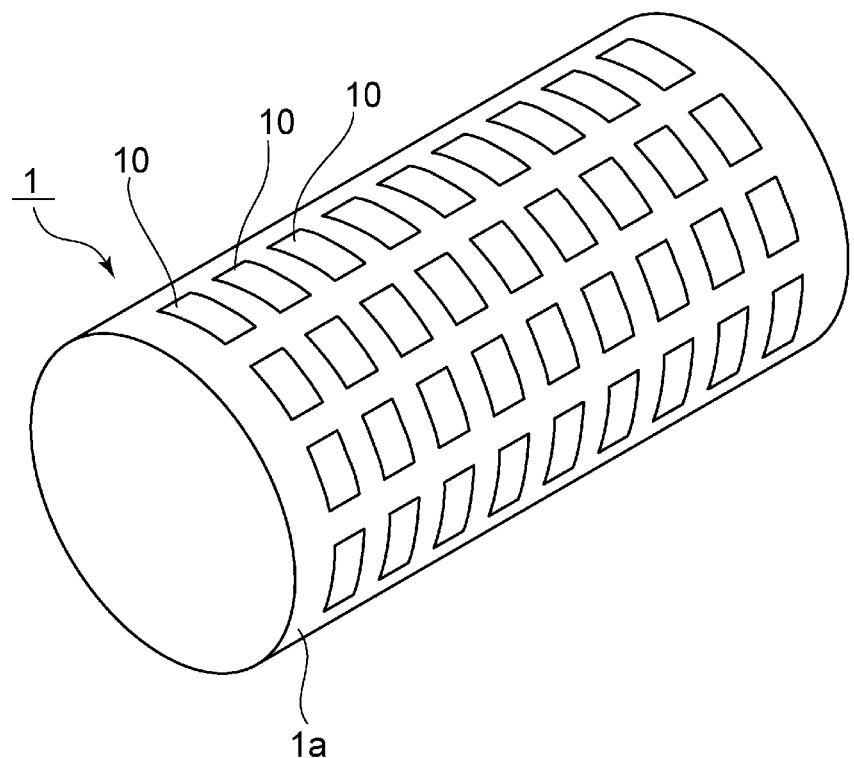
FIG. 1A is an overall perspective view illustrating the exterior of a gravure plate obtained according to an embodiment of the present disclosure.
Figure 1B:
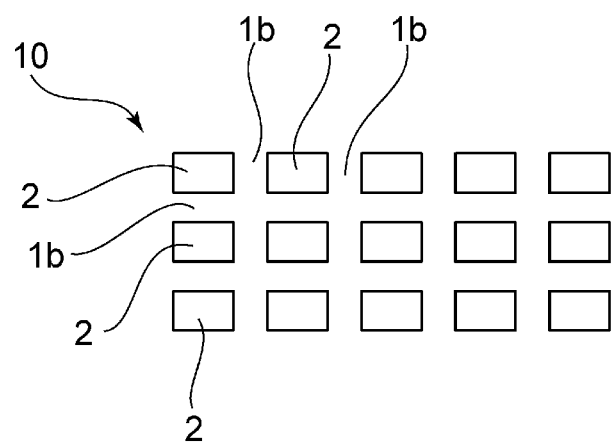
FIG. 1B is an overall plan view illustrating a single printing portion.

FIG. 1A is an overall perspective view illustrating a gravure plate obtained through a method for manufacturing a gravure plate according to an embodiment of the present disclosure, and FIG. 1B is an overall plan view illustrating a single printing portion.

A gravure plate 1 is made of a metal such as stainless steel. The gravure plate 1 has an approximately cylindrical shape. A plurality of printing portions 10 are formed in a substantially cylindrical surface 1a of the gravure plate 1.

Each of the printing portions 10 is a portion that transfers a conductive paste onto a printing target so as to form a single printed shape. As illustrated in FIG. 1B, a single printing portion 10 includes a plurality of cells 2. The plurality of cells 2 are formed as recess portions in the surface 1a, which is a side surface of the gravure plate 1 illustrated in FIG. 1A. The plurality of cells 2 are filled with a paste or the like serving as a printing material, which is then transferred to the printing target. The single printed shape is formed by using the plurality of cells 2 as a group.

Figure 2:
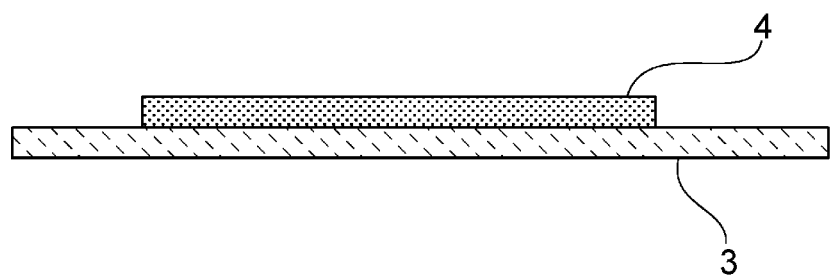
FIG. 2 is a forward cross-sectional view illustrating a state in which an electrode paste is printed on a ceramic green sheet serving as an electronic component base material, according to an embodiment of the present disclosure.

The gravure plate 1 according to the present embodiment is used to print an electrode paste 4 for forming an internal electrode of an electronic component on a ceramic green sheet 3, illustrated in FIG. 2. In other words, the electrode paste 4 is printed on the ceramic green sheet 3, which serves as an electronic component base material, so as to have a substantially flat, rectangular shape. The electrode paste 4 having the substantially flat, rectangular shape is formed by the conductive paste added to the plurality of cells 2 being transferred.

In other words, in FIG. 1B, the single printing portion 10 is configured by the plurality of cells 2 being defined by banks 1b. The printed shape of the electrode paste 4 is determined by the printing portion 10. It is necessary to form the cells 2 with precision in order for the post-printing film thickness of the electrode paste 4 to have a desired film thickness.

Note that some adjacent cells 2 defined by the banks 1b may communicate with each other. In other words, the cells defined by banks also include cells that are not completely partitioned from each other.

The present disclosure can be applied preferably in cells having a depth of approximately no greater than 30 μm and a maximum surface length of approximately no greater than 150 μm. Alternatively, the present disclosure can be applied preferably in cells having an aspect ratio (depth/maximum length) of approximately no greater than 0.3. Although it has been difficult to control the film thickness in such cells using methods according to the related art, the present disclosure makes it possible to control the film thickness with a high level of precision.

A method for manufacturing the gravure plate 1 according to the present embodiment will be described in detail hereinafter.

When manufacturing the gravure plate 1, first, a substantially cylindrical metal roll is prepared. It is then necessary to precisely form the plurality of cells 2 illustrated in FIG. 1B in the substantially cylindrical metal roll.

Figure 3:
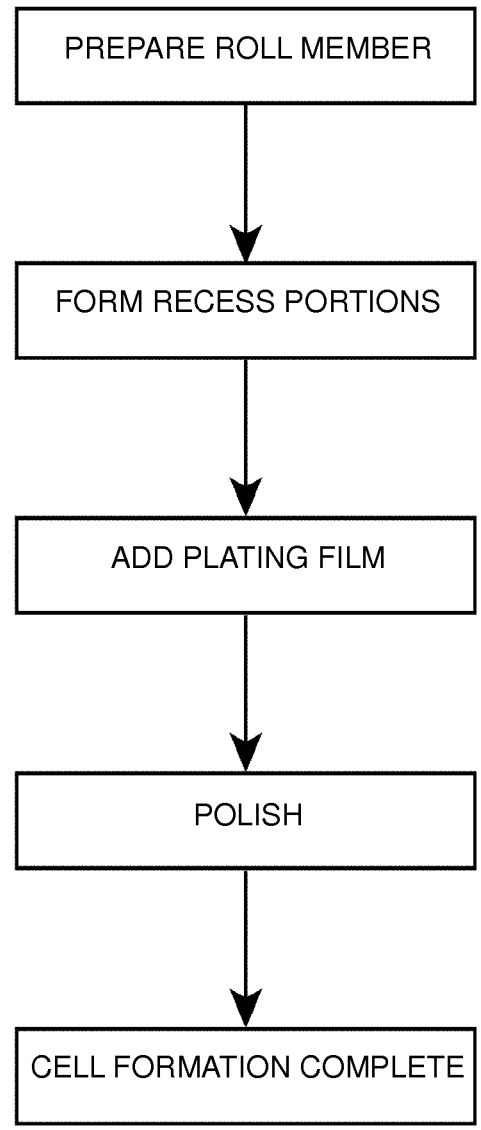
FIG. 3 is a flowchart illustrating a method for manufacturing a gravure plate according to an embodiment of the present disclosure.

In the present embodiment, first, a roll member is prepared, as illustrated in FIG. 3. The roll member is not particularly limited as long as it has a substantially cylindrical shape, and any suitable metal such as stainless steel can be used as the material thereof.

Next, a plurality of recess portions are formed in the surface 1a of the roll member. The recess portions are formed having a shape corresponding to the cells 2. The recess portions can be formed by etching the surface of the roll member. However, instead of etching, the recess portions may be formed through laser processing, a mechanical processing method, or the like.

Figure 4A:
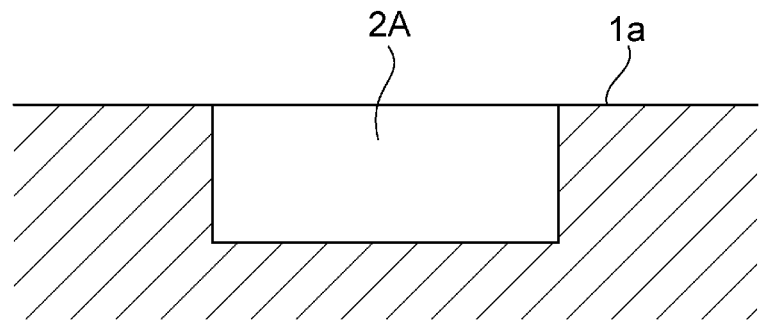
FIGS. 4A to 4C are enlarged partial cross-sectional views illustrating respective steps in a method for manufacturing a gravure plate according to an embodiment of the present disclosure.

FIG. 4A is an enlarged partial cross-sectional view illustrating a state in which a recess portion 2A has been formed in the surface 1a of the roll member.

Figure 4B:
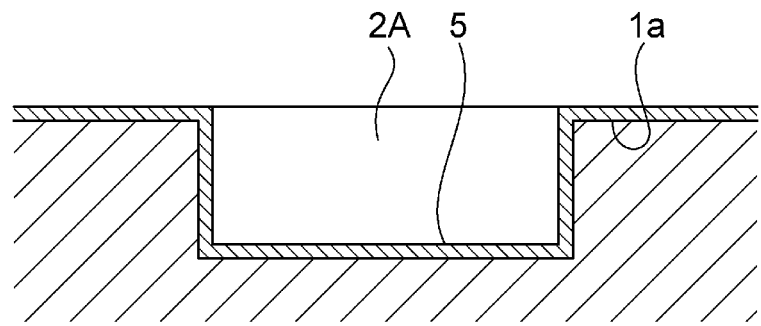

Next, as illustrated in FIG. 4B, a plating film 5 is added to the surface 1a of the roll member. The plating film 5 is provided in order to reinforce the printing portion that includes the cells. The plating film 5 is added using a suitable plating method such as electroplating. The material of which the plating film 5 is made is not particularly limited as long as it provides a reinforcing effect, and a plating film made of Cr, DLC (Diamond-like Carbon), Ni, or the like can be used.

Forming the plating film 5 slightly reduces the volume of the recess portion 2A.

Accordingly, in the method for manufacturing a gravure plate according to the present disclosure, at least one of a spatial volume and an average depth of the cells can be adjusted by adjusting the thickness of the plating film formed on the base surface of the cells when forming the plating film on the surface of the gravure plate. In this case, it is preferable, when adjusting the thickness of the plating film, to use a difference in the speed of plating on the surface of the gravure plate between cells and the speed at which the plating film is formed on the base surfaces of the cells. Using the difference in plating speeds makes it easy to adjust the thickness of the plating film on the base surfaces of the cells.

Figure 4C:
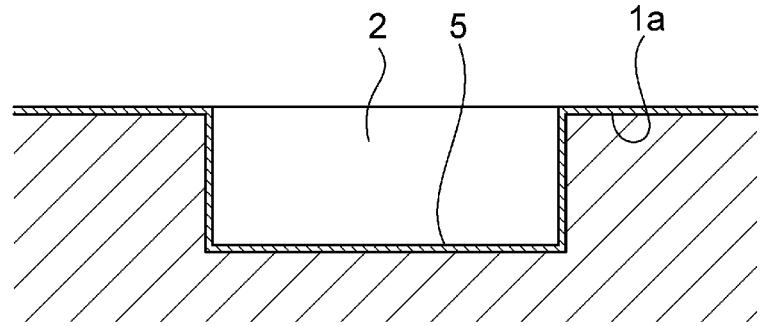

Next, the thickness of the plating film 5 is slightly reduced through polishing, as illustrated in FIG. 4C. In this manner, the adjustment of at least one of the spatial volume and the average depth may be carried out in the polishing process.

The shape of the recess portion 2A is adjusted in this manner, and the cell 2 is formed. The polishing method is not particularly limited, and a polishing method such as centrifugal polishing, paper tape polishing, or the like can be used.

As illustrated in FIGS. 4A to 4C, in the present embodiment, the roll member is prepared, and the cells 2 are then formed through the processes of forming the recess portions 2A, adding the plating film 5, and polishing.

It is necessary for the shape of the cells 2 to be formed in a highly precise manner so that the applied film thickness of the printed material that is ultimately printed is within a target film thickness range. In the aforementioned Japanese Unexamined Patent Application Publication No. 2009-90661, controlling the film thickness is carried out based on the depth of the cells when forming the cells. However, as described above, the film thickness of the printed material has tended to vary even if the film thickness is controlled based on the depth of the cells.

In the case of manufacturing the gravure plate 1 according to the present embodiment, when obtaining the above-described cells 2, the application thickness of the printing material is controlled based not on the depth of the cells 2, or in other words, the plate depth, but based instead on the spatial volume of the cells 2 or the "average depth" of the cells 2, determined as described below.

Using the spatial volume or the average depth instead of the plate depth makes it possible to control the application thickness with a high level of precision. This was first discovered by the inventors of the disclosure disclosed in this application.

The spatial volume and the average depth are values defined as follows.

After the plurality of recess portions have been formed in the surface of the gravure plate, a certain measurement area is set within a region in which the plurality of recess portions are provided. The measurement area may be set in any manner as long as a plurality of recess portions are present within a single measurement area. Although the number of the plurality of recess portions is not particularly limited, 4 to 25 recess portions is a desirable number. The spatial volume or the average depth can be found precisely when the number is in this range. An outer perimeter of the measurement area is determined based on, for example, an apex of the banks corresponding to the highest position of the banks in the width direction thereof. In the present embodiment, where the cells are substantially rectangular, the measurement area may be set by causing an apex of the outer perimeter of the measurement area to match a point of intersection between the apexes of banks extending in different directions and causing a side of the outer perimeter of the measurement area to match the apex of a bank extending in one direction.

Next, an image of the surface of the gravure plate is captured using a microscope and a camera connected to the microscope. In this case, the image is captured by the camera at a plurality of depth positions by adjusting the focus of the microscope. Through this, images of the measurement area are obtained at a variety of height positions.

A surface area of the measurement area is taken as a base surface area. The spatial volume, from the highest part of the measurement area to the base of the recess portions, is found by integrating the surface areas of spatial portions based on the plurality of different images obtained in the height direction. In other words, the spatial volume is the total volume of the recess portions in the measurement area. The average depth is obtained by dividing the spatial volume by the base surface area.

Figure 5A:
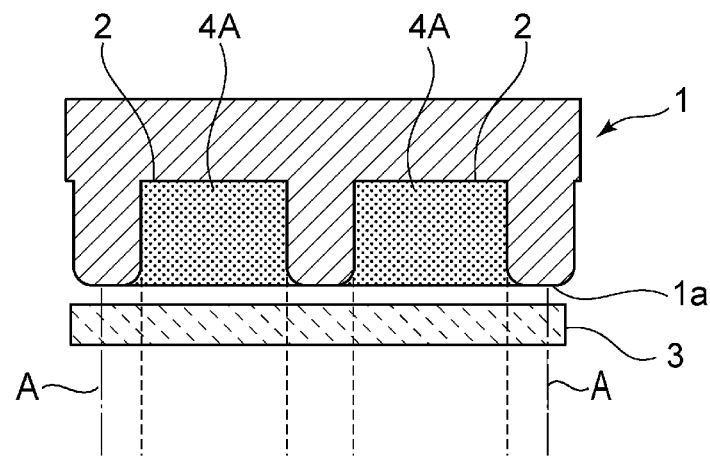
FIGS. 5A to 5C are respective schematic cross-sectional views illustrating an average depth that is controlled, according to an embodiment of the present disclosure.
Figure 5B:
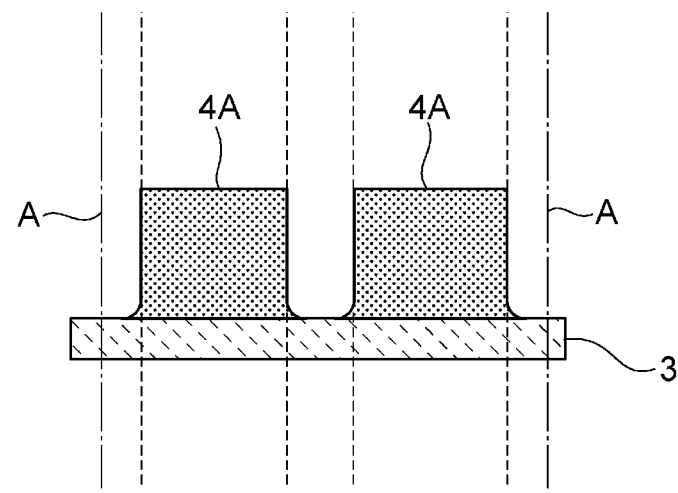

FIG. 5A illustrates a state in which the cells 2 of the gravure plate 1 are filled with a paste 4A. The ceramic green sheet 3 is disposed so as to oppose the surface 1a of the gravure plate 1. As illustrated in FIG. 5B, the surface 1a of the gravure plate 1 is pressed against the ceramic green sheet 3, and the gravure plate 1 is then separated from the surface of the ceramic green sheet 3. As a result, two instances of the paste 4A and 4A adhere to the ceramic green sheet 3. Thereafter, the paste 4A and 4A, which have fluidity, move and combine, spreading out due to the fluidity, resulting in the printed shape of the paste 4 indicated in FIG. 5C.

Figure 5C:
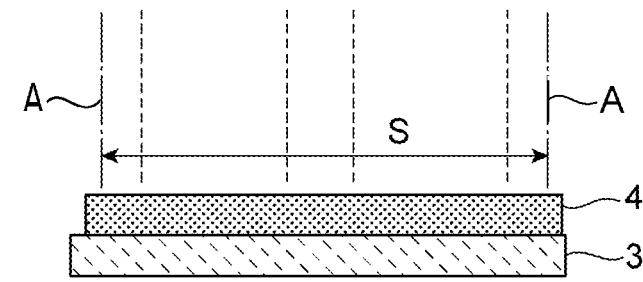

A region enclosed by dot-dash lines A and A in FIGS. 5A to 5C represents a measurement area S.

Meanwhile, the spatial volume is the total of the volumes of the cells 2 and 2.

Figure 6:
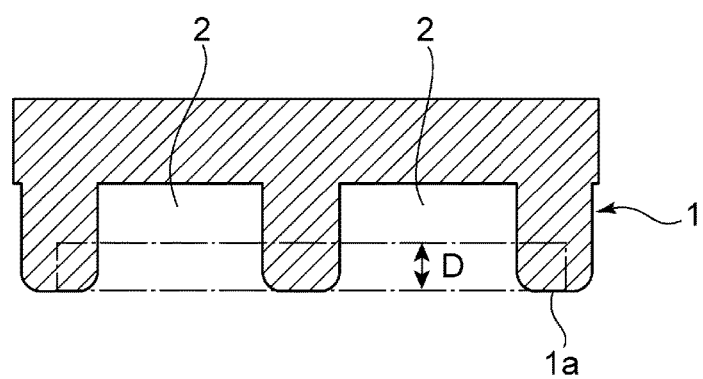
FIG. 6 is a schematic cross-sectional view illustrating a relationship between an average depth and cells defined in a printing method for a gravure plate according to an embodiment of the present disclosure.

To rephrase, in the gravure plate 1 illustrated in FIG. 6, the total volume of the plurality of cells 2 in the measurement area is the spatial volume, and an average depth D relative to the spatial volume corresponds to a value obtained by dividing the spatial volume by the aforementioned base surface area. In other words, the paste 4A and 4A is spread out after being transferred, and the printed shape is formed. Accordingly, the thickness of the printed shape of the paste 4 that is ultimately obtained, illustrated in FIG. 5C, correlates more strongly to the spatial volume, the average depth obtained by dividing the spatial volume by the aforementioned base surface area, or the like, than to the thickness of the cells 2. This will be described with reference to FIGS. 7 and 8.

Figure 7:
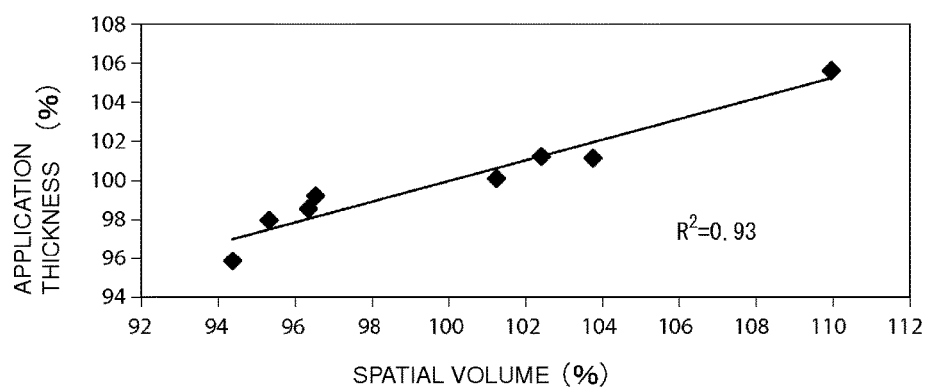
FIG. 7 is a graph illustrating a relationship between a spatial volume and an application thickness in a gravure plate obtained using a manufacturing method according to an embodiment of the present disclosure.
Figure 8:
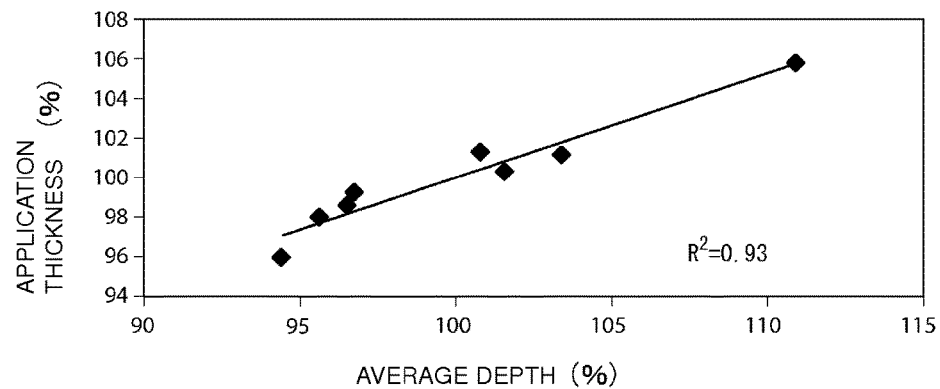
FIG. 8 is a graph illustrating a relationship between an average depth and an application thickness in a gravure plate obtained using a manufacturing method according to an embodiment of the present disclosure.

FIG. 7 is a graph illustrating a relationship between the spatial volume and the post-printing paste application thickness, and FIG. 8 is a graph illustrating a relationship between the average depth and the application thickness. In FIGS. 7 and 8, the application thickness (%) is expressed as a ratio based on a target application thickness, and the spatial volume (%) and average depth (%) are expressed as ratios based on a given spatial volume and average depth.

As can be seen from FIG. 7, there is an extremely high correlation of $R^2=0.93$ between the spatial volume and the application thickness in the gravure plate 1. In addition, as illustrated in FIG. 8, there is also an extremely high correlation of $R^2=0.93$ between the average depth and the application thickness.

Note that when a correlation between a plate depth, which is represented by the cell depth in gravure plates according to the related art, and the application thickness was found, the correlation was quite low at $R^2=0.06$. That is to say that the application thickness cannot be controlled with a high level of precision by controlling the plate depth.

However, it can be seen that with the gravure plate 1 according to the present embodiment, the application thickness is controlled using the spatial volume or the average depth, and variation in the application thickness of the paste can be greatly reduced as a result.

Next, a method for controlling the spatial volume or the average depth so as to obtain a target application thickness when manufacturing the gravure plate will be described with reference to FIGS. 9 and 10.

Figure 9:
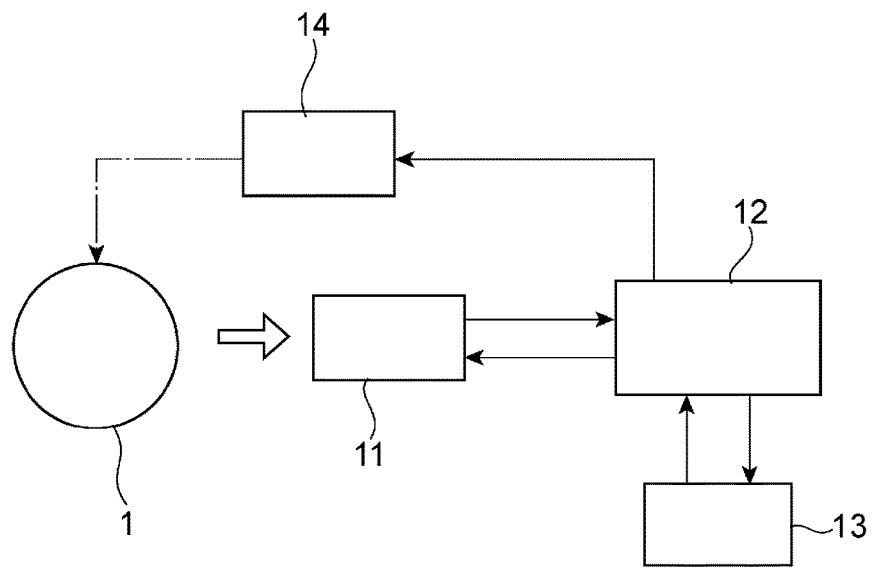
FIG. 9 is an overall block diagram illustrating a configuration for controlling an average depth in a method for manufacturing a gravure plate according to an embodiment of the present disclosure.
Figure 10:
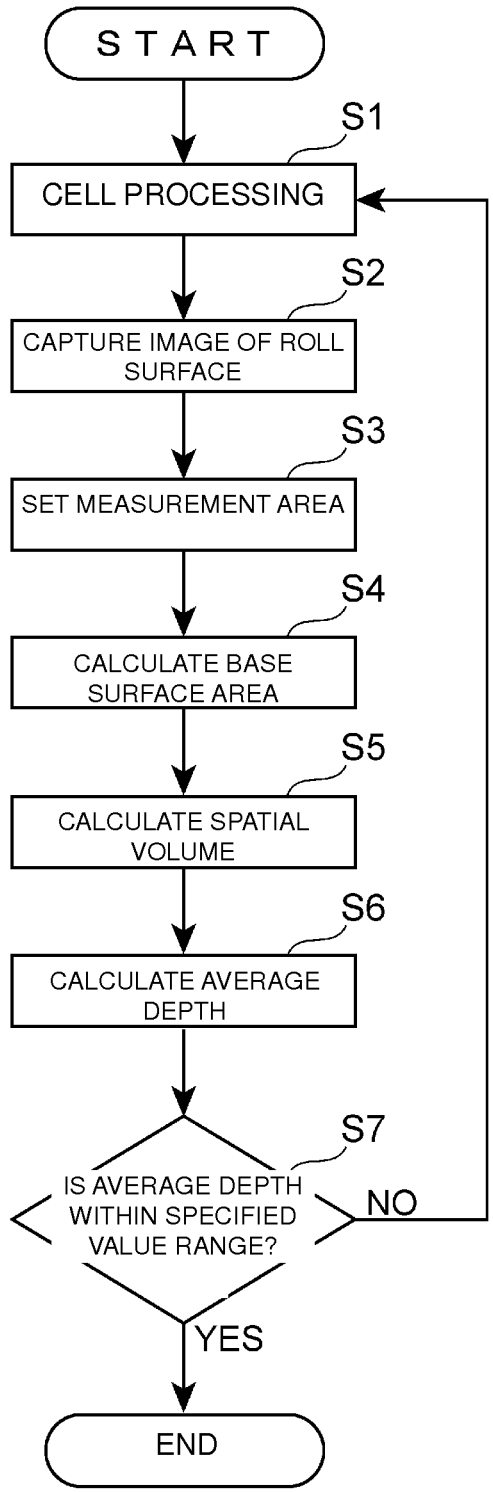
FIG. 10 is a flowchart illustrating a method for controlling an average depth in a method of manufacturing a gravure plate according to an embodiment of the present disclosure.

As illustrated in FIG. 9, the gravure plate 1, on the surface of which the recess portions have been formed, is prepared. Images of the surface of the gravure plate 1 are captured by an image capturing device 11 that includes a microscope and a camera. A control device 12 outputs a signal that causes the image capturing device 11 to start capturing images of the gravure plate 1. The control device 12 also receives signals representing the images captured by the image capturing device 11. The image capturing device 11 is configured so as to be capable of capturing images at various height positions in a set area of the gravure plate 1. More specifically, as described earlier, using a configuration in which, for example, a microscope and a camera are connected, the image capturing device 11 can obtain images at various height positions by shifting the focus of the microscope.

A memory 13 is connected to the control device 12. Correlation data found in advance between the aforementioned spatial volume or average depth and the application thickness is stored in the memory 13. In other words, the data indicated in FIG. 7 or FIG. 8 is stored in the memory 13.

Meanwhile, a processing device 14 is connected to the control device 12. The processing device 14 processes the surface of the gravure plate 1 based on signals supplied from the control device 12. A variety of processing methods that determine the shape of the cells, such as etching, forming a plating film, and polishing, can be given as examples of the processing method. As illustrated in FIG. 10, first, in step S1, the cells are processed in the surface of the gravure plate 1. The process for forming the cells assumes that one of the aforementioned variety of processing methods, such as forming the recess portions through etching, adding a plating film, and then polishing, is employed.

For example, in the method for manufacturing a gravure plate illustrated in FIG. 3, the polishing process carried out last will be described as the cell formation process of step S1.

Next, in step S2, the image capturing device 11 captures an image of the surface of the polished roll. Thereafter, in step S3, the control device 12 sets the measurement area. Then, in step S4, the aforementioned base surface area S is found.

Next, in step S5, the control device 12 obtains a variety of images while shifting the focus of the image capturing device 11, and calculates the spatial volume based on the signals representing the images.

In step S6, the average depth is obtained by dividing the spatial volume by the base surface area.

In step S7, the control device 12 determines, based on the correlation data stored in the memory 13, whether or not the calculated average depth is within a specified value range for obtaining a desired application thickness. The control ends when the calculated average depth is within the specified value range. However, in the case where the average depth does not fall within the specified value range, the cells are processed once again based on step S1. Steps S2 to S7 are then repeated and the process ends when the average depth has entered the specified value range.

According to this control method, the gravure plate can be manufactured so as to have the target average depth with certainty by repeating the polishing process indicated in FIG. 3.

Note that the cell processing of step S1 does not necessarily need to be the above-described polishing, and may instead be the recess portion formation process, the plating film adding process, or the like indicated in FIG. 3. In other words, the recess portion may be formed through etching, for example, as step S1; steps S2 to S7 may then be executed; whether or not the average depth is within the target range may be determined in step S7; and the process may return to step S1 and the etching is carried out again in the case where the average depth is outside of the target range.

Alternatively, the plating film adding process indicated in FIG. 3 may be carried out as step S1, and in the case where the average depth is outside of the specified value range in step S7, the process may return to step S1, where control is carried out for reducing the average depth, such as adding the plating film again, executing a plating process to increase the plating film thickness, or the like.

Furthermore, the average depth may be controlled using the above-described control method in two or more of the above processes, namely the recess portion forming process, the plating film adding process, and the polishing process.

Meanwhile, step S5 may be omitted, and the cell processing control may be carried out using the spatial volume instead of the average depth in step S7.

According to the method for manufacturing a gravure plate described in this embodiment, a gravure plate that has a low amount of film thickness variation following the gravure printing of a printed material such as the paste 4 and that can achieve a target application thickness can be provided easily and with certainty.

Although FIGS. 7 and 8 indicate that there is no significant difference between a correlation coefficient when using the spatial volume and a correlation coefficient when using the average depth, it should be noted that this is because the correlations are found for gravure plates having the same design. When comparing gravure plates having different designs, such as gravure plates whose cell sizes, bank widths, or the like differ, gravure plates whose cell shapes differ, and so on, the correlation coefficient is higher for the average depth, which is a parameter corresponding to the film thickness of the printed paste. Accordingly, it is preferable to use the average depth rather than the spatial volume.

The gravure plate can be manufactured through the method described above. Next, a method for obtaining the ceramic green sheet 3 on which the conductive paste 4 is formed using the gravure plate 1 will be described.

Figure 11:
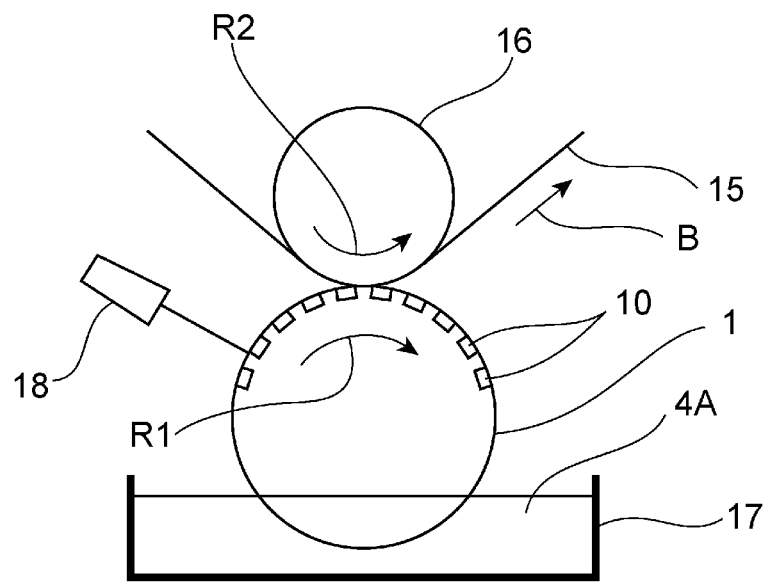
FIG. 11 is a schematic diagram illustrating a method for applying a paste to a ceramic green sheet using a gravure plate according to an embodiment of the present disclosure.

FIG. 11 is a schematic diagram illustrating a method for applying a paste to a ceramic green sheet using the gravure plate according to the embodiment of the present disclosure.

A ceramic green sheet 15 is backed by a carrier film (not shown) and transported in such a state. The carrier film is held between a roller 16 and the gravure plate 1 so that the ceramic green sheet 15 on the carrier film is pressed against the gravure plate 1. The roller 16 is rotated in a rotational direction R2 that is the opposite direction from a rotational direction R1 of the gravure plate 1. As a result, the roller 16 transports the carrier film and the ceramic green sheet 15 on the carrier film in a transport direction B.

As illustrated in FIG. 11, the gravure plate 1 is submerged in the conductive paste 4A, which is held in a tank 17, and as a result, the paste 4A is supplied to the plurality of printing portions 10 formed in the circumferential surface of the gravure plate 1. The paste 4A may be supplied to the gravure plate 1 through a method such as ejecting the paste 4A toward the gravure plate 1, however. Extra paste 4A on the circumferential surface of the gravure plate 1 is wiped off by a doctor blade 18. Thereafter, the gravure plate 1 is pressed against the ceramic green sheet 15, which has a long shape, while rotating in the rotational direction R1, and the paste 4A is continuously transferred to the ceramic green sheet 15 as a conductive film.

Because the conductive film continuously transferred using the gravure plate manufactured according to the aforementioned method is close to the target film thickness, loss of paste, ceramic green sheets, and the like due to the film thickness being outside the target range can be reduced. The ceramic green sheet 3 on which the paste 4 is formed, illustrated in FIG. 2, is obtained in this manner. Thereafter, a plurality of the ceramic green sheets 3 are stacked and bonded under pressure, cut as necessary, and then fired, producing a ceramic sintered body to serve as a component main body for a laminated ceramic electronic component. The aforementioned conductive paste 4 constitutes an internal electrode in the ceramic sintered body. Next, the laminated ceramic electronic component is completed by forming outer electrodes and the like on an outer surface of the ceramic sintered body as necessary.

Although the foregoing embodiment describes a method in which a ceramic green sheet that is an electronic component base material is prepared and a paste is then printed onto the ceramic green sheet using the gravure plate 1, the present disclosure can be used broadly in methods for printing pastes onto the surfaces of printing materials aside from electronic component base materials. The present disclosure is particularly effective when printing paste using a gravure plate whose depth is no greater than approximately 15 μm, where film thickness variation and cell processing precision worsen.

Although the cells in the aforementioned embodiment have substantially rectangular shapes that are completely partitioned from each other, the present disclosure can be used broadly for a variety of cell shapes.

Figure 12A:
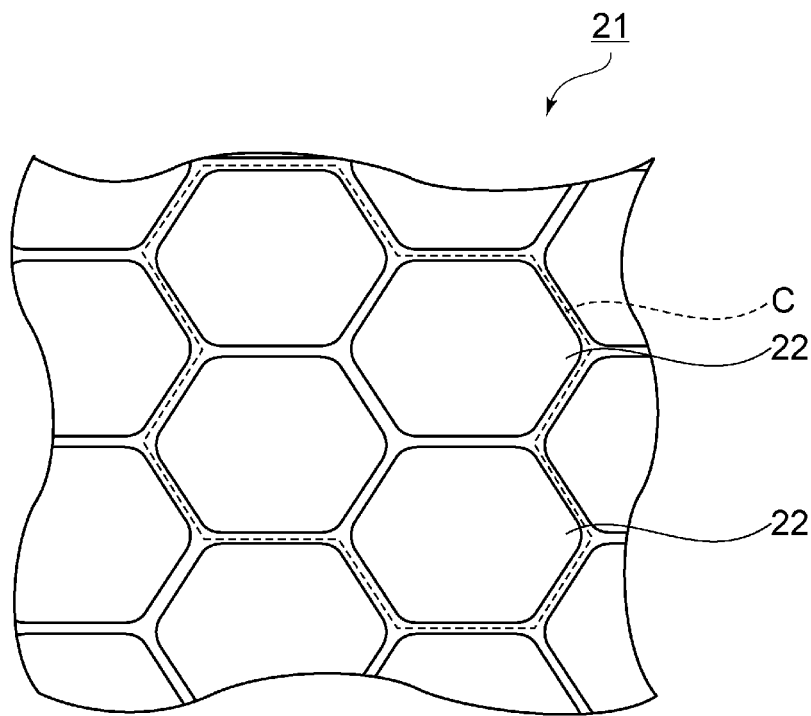
FIG. 12A is a partial cutout view illustrating a first variation on a gravure plate according to the present disclosure and a measurement area.
Figure 12B:
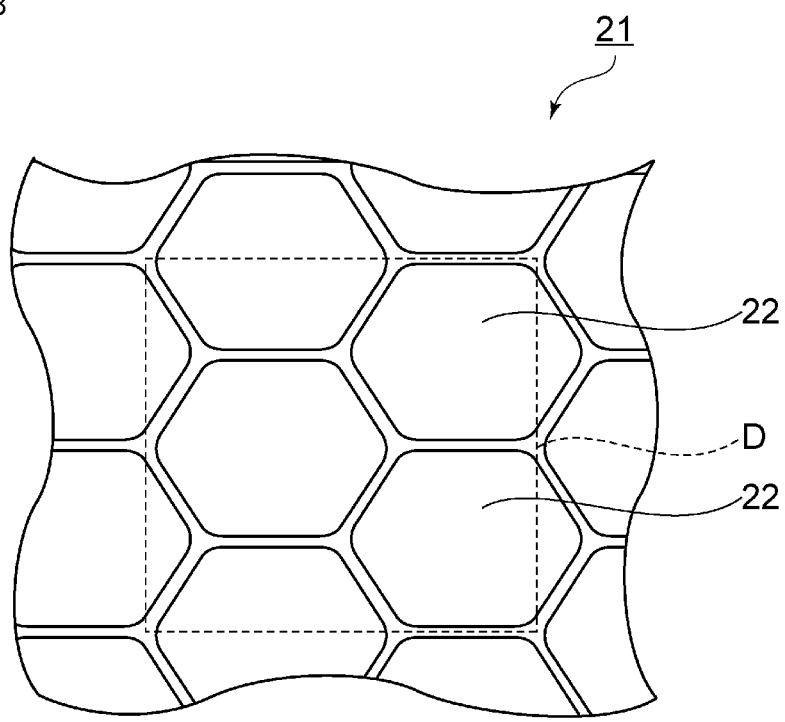
FIG. 12B is a partial cutout view illustrating a measurement area in a different case from that illustrated in FIG. 12A.

For example, the present disclosure can also be applied in a gravure plate 21 having substantially hexagonal cells 22, as indicated in a first variation illustrated in FIGS. 12A and 12B. Although the measurement area is not particularly limited in this case, the measurement area may be set to, for example, a polygonal area containing an integer of the substantially hexagonal shapes, as indicated by a broken line C in FIG. 12A. Alternatively, the measurement area may be a substantially rectangular area obtained by connecting the apexes of a plurality of the substantially hexagonal shapes, as indicated by a broken line D in FIG. 12B.

Furthermore, the present disclosure can be applied to, for example, a gravure plate 31 in which adjacent substantially rectangular cells 32 partially communicate with each other, as indicated in a second variation illustrated in FIG. 13. Although the measurement area is not particularly limited in this case, a substantially rectangular area indicated by a broken line E may be used, for example. Here, it is assumed that a circumferential direction of the gravure plate is a first direction x and a direction perpendicular to the first direction x is a second direction y. Straight lines passing through the center of a bank $31b1$ extending in the first direction x at an arbitrary position and a bank $31b3$ extending in the first direction x several cells away from the bank $31b1$ are indicated by E1 and E3. Straight lines passing through the center of a bank $31b2$ extending in the second direction y at an arbitrary position and a bank $31b4$ extending in the second direction y several cells away from the bank $31b2$ are indicated by E2 and E4. In this case the measurement area is set to a substantially rectangular area defined by connecting the points where the straight lines E1 to E4 intersect. With a gravure plate in which cells partially communicate in this manner, using a method of managing the plate depth according to the related art results in an extremely high level of film thickness variation, whereas applying the present disclosure can effectively reduce film thickness variation. Accordingly, the present disclosure is particularly effective in gravure plates in which cells partially communicate with each other.

While preferred embodiments of the disclosure have been described above, it is to be understood that variations and modifications will be apparent to those skilled in the art without departing from the scope and spirit of the disclosure.

The scope of the disclosure, therefore, is to be determined solely by the following claims.

What is claimed is:

1. A method for manufacturing a gravure plate having a surface with a printing portion in which a plurality of recess-shaped cells are defined by banks between the cells, the gravure plate being configured to print a printing material having an application thickness onto a printing target, the method comprising the steps of:

preparing the gravure plate by preparing a substantially cylindrical metal roll and forming the plurality of cells in the surface of the metal roll;

setting a measurement area on the surface of the gravure plate, the measurement area including a plurality of the cells;

finding at least one of a spatial volume and an average depth of the plurality of cells in the measurement area, the spatial volume being a volume of a space formed by the plurality of cells in the measurement area, the average depth being obtained by dividing the spatial volume by a surface area of the plurality of cells in the measurement area; and adjusting the at least one of the spatial volume and the average depth of the plurality of cells in the measurement area to thereby cause the application thickness of the printing material after printing using the gravure plate to satisfy a target value range for the application thickness, the adjusting being based on a relationship between the application thickness of the printing material after printing and the at least one of the spatial volume and the average depth.

2. The method for manufacturing a gravure plate according to claim 1, wherein the step of adjusting of at least one of the spatial volume and the average depth includes a step of increasing a depth of the cells through etching.

3. The method for manufacturing a gravure plate according to claim 1, wherein the step of adjusting of at least one of the spatial volume and the average depth includes a step of adjusting a thickness of a plating film formed on a base surface of the cells when forming a plating film on the surface of the gravure plate.

4. The method for manufacturing a gravure plate according to claim 3, wherein a difference in a speed of plating on a part of the surface of the gravure plate between cells and a speed of plating for forming the plating film on the base surface of the cells is used when adjusting the thickness of the plating film.

5. The method for manufacturing a gravure plate according to claim 1, wherein the step of adjusting of at least one of the spatial volume and the average depth includes a step of polishing.

6. The method for manufacturing a gravure plate according to claim 1, wherein in the step of setting of the measurement area, using an image capturing device that captures an image of the surface of the gravure plate, a storage device that stores correlation data indicating a correlation between the average depth or the spatial volume and the application thickness of the printing material after printing, and a control device, a plurality of different images are obtained by the image capturing device in a depth direction of the surface of the gravure plate, and the measurement area is set by the control device based on the plurality of images; and in the step of finding of at least one of the spatial volume and the average depth, the control device finds a spatial volume by integrating the plurality of images obtained by the image capturing device in a depth direction of the cells or finds the average depth by dividing the found spatial volume by the surface area of the measurement area.

7. The method for manufacturing a gravure plate according to claim 6, wherein in the case where at least one of the spatial volume and the average depth found from the plurality of images obtained by the image capturing device capturing images of the surface of the gravure plate is not within at least one of a specified value range for the spatial volume and a specified value range for the average depth that are based on the target value range for the application thickness, the cells of the gravure plate are processed so that at least one of the spatial volume and the average depth falls within the specified value range.

* * * * *